United States Patent
Schliwa et al.

(10) Patent No.: US 10,434,738 B2
(45) Date of Patent: Oct. 8, 2019

(54) WASTE COMPACTION SYSTEM FOR A VEHICLE, CABIN MONUMENT FOR A VEHICLE HAVING SUCH A WASTE COMPACTION SYSTEM AND VEHICLE HAVING AT LEAST ONE WASTE COMPACTION SYSTEM

(71) Applicant: Airbus Operations GmbH, Hamburg (DE)

(72) Inventors: Ralf Schliwa, Hamburg (DE); Marc Spille, Hamburg (DE)

(73) Assignee: Airbus Operations GmbH (DE)

( * ) Notice: Subject to any disclaimer, the term of this patent is extended or adjusted under 35 U.S.C. 154(b) by 1082 days.

(21) Appl. No.: 14/722,391

(22) Filed: May 27, 2015

(65) Prior Publication Data
US 2015/0343732 A1 Dec. 3, 2015

(30) Foreign Application Priority Data
May 28, 2014 (EP) .................................... 14170394

(51) Int. Cl.
*B30B 9/30* (2006.01)
*B65F 1/14* (2006.01)
(Continued)

(52) U.S. Cl.
CPC .............. *B30B 9/3039* (2013.01); *B30B 5/02* (2013.01); *B30B 9/305* (2013.01); *B30B 9/3007* (2013.01);
(Continued)

(58) Field of Classification Search
CPC ..... B30B 9/3039; B30B 9/305; B30B 9/3057; B30B 5/02; B30B 9/3007; B65F 1/0033;
(Continued)

(56) References Cited

U.S. PATENT DOCUMENTS 3,269,157 A * 8/1966 Ashley .................... D06F 47/00
100/211
3,735,898 A 5/1973 Smith
(Continued)

FOREIGN PATENT DOCUMENTS

CH        700 180 B1    7/2010
CN     103025509 A    4/2013
(Continued)

OTHER PUBLICATIONS

European Search Report dated Nov. 17, 2014.
(Continued)

*Primary Examiner* — Jimmy T Nguyen
(74) *Attorney, Agent, or Firm* — Lerner, David, Littenberg, Krumholz & Mentlik, LLP

(57) ABSTRACT

A waste compaction system for a vehicle includes a moveable trolley for storing waste, and a docking station integratable into a cabin monument for inserting the trolley. The trolley includes a housing having an opening for inserting waste, a vacuum waste compacting mechanism inside the housing and a first suction port accessible from outside the housing, the first suction port being couplable with the vacuum waste compacting mechanism. The docking station and the trolley are adapted to each other such that the trolley is engageable with the docking station, and wherein the docking station includes a second suction port couplable with a suction line in the vehicle and the first suction port. Resultantly, a lightweight and efficient waste compaction system is provided, which allows moving the trolley for collecting waste inside a cabin of the vehicle.

13 Claims, 8 Drawing Sheets

(51) Int. Cl.
*B64D 11/04* (2006.01)
*B30B 5/02* (2006.01)

(52) U.S. Cl.
CPC ............ *B30B 9/3057* (2013.01); *B64D 11/04* (2013.01); *B65F 1/1426* (2013.01); *B65F 1/1473* (2013.01); *B65F 1/1405* (2013.01)

(58) Field of Classification Search
CPC .... B65F 1/1405; B65F 1/1426; B65F 1/1473; B64D 11/04; Y10S 220/908; Y02W 30/10
USPC ........................................ 100/90, 100, 229 A
See application file for complete search history.

(56) References Cited

U.S. PATENT DOCUMENTS

| | | | |
|---|---|---|---|
| 3,908,749 A | | 9/1975 | Williams |
| 4,070,962 A | | 1/1978 | Peterson |
| 4,140,356 A | * | 2/1979 | Chervanak ............ A47B 67/04 312/111 |
| 4,323,110 A | * | 4/1982 | Rubbright ............ F25D 23/12 165/201 |
| 4,444,099 A | | 4/1984 | Paleschuck |
| 4,573,650 A | | 3/1986 | Clayton |
| 4,620,479 A | | 11/1986 | Diamond et al. |
| 4,680,808 A | * | 7/1987 | Paleschuck ............ B65F 1/06 383/9 |
| 4,957,491 A | | 9/1990 | Parker |
| 5,490,455 A | | 2/1996 | Conti et al. |
| 6,012,678 A | | 1/2000 | Hale et al. |
| 6,223,361 B1 | | 5/2001 | Rozenblatt |
| 6,601,913 B2 | | 8/2003 | Romca et al. |
| 6,640,701 B2 | | 11/2003 | Hoffjann et al. |
| 6,893,425 B2 | | 5/2005 | Dunn et al. |
| 6,994,022 B2 | | 2/2006 | Paleschuck |
| 7,322,286 B2 | * | 1/2008 | Labeille ............ B30B 9/3032 100/211 |
| 7,500,430 B2 | * | 3/2009 | Claflin ............ B30B 9/3039 100/100 |
| 8,424,130 B2 | | 4/2013 | Dannenberg et al. |
| 9,221,600 B2 | | 12/2015 | Iacobucci |
| 2002/0092580 A1 | | 7/2002 | Miller et al. |
| 2003/0136279 A1 | * | 7/2003 | Tarlow ............ B30B 9/305 100/90 |
| 2004/0216222 A1 | | 11/2004 | Rood |
| 2005/0072324 A1 | * | 4/2005 | Paleschuck ............ B30B 9/305 100/127 |
| 2005/0209585 A1 | | 9/2005 | Nord et al. |
| 2007/0034098 A1 | | 2/2007 | Labeille et al. |
| 2008/0034987 A1 | | 2/2008 | Claflin et al. |
| 2008/0282912 A1 | * | 11/2008 | Jardine ............ B30B 9/3032 100/269.01 |
| 2009/0012485 A1 | | 1/2009 | Michaels et al. |
| 2012/0103206 A1 | | 5/2012 | Doaran et al. |
| 2014/0041110 A1 | | 2/2014 | Dannenberg |
| 2015/0108888 A1 | | 4/2015 | Galimberti |
| 2015/0343732 A1 | | 12/2015 | Schliwa et al. |

FOREIGN PATENT DOCUMENTS

| | | |
|---|---|---|
| DE | 27 37 122 A1 | 3/1978 |
| DE | 41 20 743 A1 | 1/1993 |
| DE | 101 29 905 B4 | 1/2003 |
| DE | 10 2007 018911 A1 | 10/2008 |
| DE | 10 2009 021 969 A1 | 11/2010 |
| EP | 1 132 293 B1 | 9/2004 |
| EP | 2 695 812 A1 | 2/2014 |
| EP | 2 949 459 A1 | 12/2015 |
| EP | 2949495 A1 | 12/2015 |
| WO | 2010/020964 A2 | 2/2010 |
| WO | 2011/091047 A1 | 7/2011 |
| WO | 2016/189131 A1 | 12/2016 |
| WO | 2016/189143 A1 | 12/2016 |

OTHER PUBLICATIONS

German Search Report dated Jun. 18, 2015.
DE 10 2015 108 442.2 German Search Report dated Mar. 7, 2016.
DE 10 2015 108 443.0 German Search Report dated Mar. 7, 2016.

* cited by examiner

WASTE COMPACTION SYSTEM FOR A VEHICLE, CABIN MONUMENT FOR A VEHICLE HAVING SUCH A WASTE COMPACTION SYSTEM AND VEHICLE HAVING AT LEAST ONE WASTE COMPACTION SYSTEM

FIELD OF THE INVENTION

The invention relates to a waste compaction system for a vehicle, a cabin monument for a vehicle having such a waste compaction system and to a vehicle having at least one such waste compaction system.

BACKGROUND OF THE INVENTION

In large passenger vehicles, in particular aircraft for long haul flights, passenger capacities tend to be ever increasing, while at the same time the efficiency of the available space inside the cabin is more and more improved. For example, cabin monuments, such as galleys and lavatories, are increasingly space efficient and allow the integration of an optimized amount of passenger seats. Besides storing food and other items it is mandatory to provide sufficient space for collecting waste.

Waste may arise from meal packages and other used items from the passengers. Simply collecting waste would lead to a plurality of bulky plastic bags, which need to be stored safely. To improve the waste collection and storage, it is known to use waste compaction systems, which may compact bulky plastic bags containing meal packages, etc. into compact and easily storable waste packages.

The most common approach for waste compaction systems in civil aircraft is based on electromechanical waste compactors, which are rather powerful but comprise a high weight due to the mechanical components such as motor, gears, supports and bearings. Further, a large part of the available space in a half size or full size trolley may be allocated for the compaction mechanism, such that only a reduced amount of waste is collectable with this trolley. Further, due to the weight of the compaction mechanism, the waste compactor is usually a fixed part of the galley and cannot be moved through the cabin. The available space for waste collection and storage is low and the reliability of electromechanical waste compactors may be insufficient.

It is further known to use vacuum-based waste compactors, which comprise vacuum pumps in the waste compactor trolley unit that comprise a sleeve or hull surrounding a waste bag, which sleeve or hull is evacuated and thereby presses the waste bag to a compact package.

BRIEF SUMMARY OF THE INVENTION

For the ease of use and an increased waste collection capacity it may be desired to provide a waste compaction system having movable trolleys with an as large capacity as possible and, at the same time, a least possible weight. Consequently, an aspect of the invention proposes an alternate waste compaction system for a vehicle with a movable trolley and a least possible weight.

Proposed is a waste compaction system for a vehicle, comprising a movable trolley for storing waste, a docking station integratable into a cabin monument for inserting the trolley, wherein the trolley comprises a housing having an opening for inserting waste, at least one vacuum waste compacting mechanism inside the housing and a first suction portion accessible from outside the housing, the first suction port being couplable with the at least one vacuum waste compacting mechanism. The docking station and the trolley are adapted to each other such that the trolley is engageable with the docking station and the docking station comprises a second suction portion couplable with a suction line in the vehicle and the first suction port.

The movable trolley may be a modified full size or half size trolley, which is a cart having lockable wheels for transport inside the cabin. The trolley comprises an opening that enables a cabin attendant to walk through the cabin and to insert waste, such as meal boxes, etc.

The docking station is the counterpart to the movable trolley and is adapted to the outer shape of the trolley, which may be attached to, inserted into, rest against, etc. the docking station in a docking position. In this docking position, the first and the second suction port are couplable with each other, such that a connection between a suction line in the vehicle and the vacuum waste compacting mechanism inside the trolley housing may be accomplished.

Generally, all known vacuum waste compacting mechanisms may be used, which depend on a suction of air. Ideally, the suction line is already present in the vehicle and thus does not require any additional components for the operation of the waste compaction system. For example, the suction line belongs to a toilet vacuum system, i.e. an on-board water and waste system, of a lavatory unit or module, which may be integrated in the same galley as the waste compaction system or in another monument, while a suction line may run through the monument carrying the waste compaction system.

For activating the compaction process, the suction line is to be coupled with the interior of the compaction sleeve. It is advantageous to conduct this using a common or modified flush valve known from lavatory units, which flush valve may be located between the suction line and the second suction port. The flush valve may be controlled through a control means, which is positioned in the vicinity of the docking station, such as a button in combination with a display or monitoring unit.

To sum up, the waste compaction system according to an embodiment of the invention allows an efficient waste compaction, provides a large collection space for waste and does not require any heavy weight components, that require a large installation space.

In an advantageous embodiment, the vacuum waste compacting mechanism comprises a compaction sleeve, which extends from a bottom of the trolley housing to a movable upper frame facing to the opening of the trolley. The compaction sleeve is to be considered a bag that basically extends through the whole trolley in a vertical direction, i.e. from a bottom to a top. The top is delimited by the movable upper frame. The intention in providing such a compaction sleeve is to provide a hull, which surrounds, i.e. encloses a waste bag and provides a compaction through sucking off air from the compaction sleeve. It goes without saying, that the compaction sleeve is coupled with the bottom of the trolley in an airtight manner, such that by inducing a suction in the compaction sleeve, air is not drawn through the bottom of the trolley into the compaction sleeve.

In a preferred embodiment, the compaction sleeve comprises two flat, rigid plates integrated into two lateral surfaces of the compaction sleeve, wherein the plates are dimensioned such that by evacuating the compaction sleeve the plates approach each other substantially parallel. The rigid plates may be made from any suitable material, which allows compression of the waste without damages to the plates. Further, the plates should comprise an as low weight as possible. For example, a fiber reinforced plastic material suggests itself, which may comprise a matrix material, such as a phenolic resin, as well as fibers made from carbon, kevlar, glass, etc. The integration of the rigid plates into the compaction sleeve may be accomplished through various different measures. For example, the rigid plates may be placed inside the compaction sleeve, i.e. into the closed and sealed compaction sleeve. The plates may at least partially be glued to an inner surface of the compaction sleeve for easily maintaining their positions. Still further, the rigid plates may also be attached to an outside of the compaction sleeve. However, in this case a sturdy connection between the plates and the compaction sleeve is desired. Still further, the plates may be an integral part of the compaction sleeve. This may be accomplished by using at least two layers in the setup of the compaction sleeve, wherein the plates are placed between two subsequent layers. Also, the compaction sleeve may be interrupted by a recess and the plates may be rigidly attached to the delimiting edges of the plates. Besides gluing, the plates may be also attached to the compaction sleeve by other suitable bonding methods, if their attachment is necessary.

In this context, the first suction port is coupled with the interior of the compaction sleeve through an opening in at least one of the compaction sleeve and the bottom of the trolley in an advantageous embodiment. Preferably, the evacuation is caused by a vacuum application on the lower side of the trolley, as an interface carrying the first suction port may be attached in a defined, exact position, to which the second suction port may easily be adapted. This position may be any one of a lateral, lower or upper position on any delimiting face of the trolley.

The first suction port may also be coupled with the interior of the compaction sleeve through an opening in or near a top, front, back or lateral face, if desired. However, the position of the interface carrying the first suction port may be independent from the opening in the compaction sleeve, such that a duct extends from the interface to the opening in the compaction sleeve.

In another advantageous embodiment, the trolley further comprises a ventilation frame, which is insertable into an interior area section of the movable upper frame, wherein the ventilation frame comprises ventilation openings and is adapted for holding a waste bag, such that the waste bag is enclosed by the compaction sleeve, and for providing air exchanged between the waste bag and a volume enclosed by the compaction sleeve. The ventilation frame conducts two functions. The first function is to hold a waste bag, which is inserted through the opening into the trolley, especially through clamping the waste bag between the ventilation frame and the upper frame. By applying a suction to the compaction sleeve, air is sucked from the compaction sleeve into the suction line. As the waste bag also comprises air it is necessary to draw off the air from the waste bag. This is conducted through ventilation openings, through which air from the waste bag may enter the compaction sleeve.

Advantageously, the waste bag comprises a closure means that is adapted to close the waste bag in an airtight manner, wherein the waste bag comprises at least one check valve that is adapted to dispose of air from the inside of the waste bag into the surrounding of the waste bag. This allows to easily dispose of air from inside the waste bag during compaction. Due to the airtight seal through the closure means a compact package with compacted waste results, which does not expand itself after releasing the compaction sleeve.

Still further, at least one tension belt surrounds at least one of a bottom part and the upper frame for clamping the compaction sleeve to the at least one of a bottom part and the upper frame. Between the bottom part and/or the upper frame and the compaction sleeve appropriate sealing material is placed so as to provide an airtight seal.

Advantageously, the opening of the trolley housing is positioned in the movable frame. Hence, the movable frame provides an upper delimitation of the usable space in the trolley and a further component having a dedicated opening is not necessary. Also, since the upper frame is movable, a sealing between the upper frame and another component carrying the opening is not necessary.

For a simpler application of the trolley, especially when collecting waste, the upper frame is lockable in at least one position. Hence, when a new waste bag is installed in the trolley, the upper frame may be held in an uppermost position, such that the available space for collecting waste is maximized. For the initiation of a compaction process, the upper frame needs to be unlocked from this uppermost position such that it may freely move inside the trolley housing.

For allowing the evacuation of the mechanism a cover plate is placeable on the opening in a sealing manner. The opening may be swiveled or moved away in order to allow waste to be inserted into the trolley. By swiveling it back onto the opening, an airtight seal is accommodated.

Further advantageously, the cover plate may be movably supported and may be fixable in a position that allows to use the cover plate as a tray or placement space for placing items that do not belong into the waste bag, when it does not cover the opening. The cover plate may be swivably supported on one of its lateral edges and may be fixed in a position at a distance of 180° from the closed position, i.e. in a horizontal position.

In another advantageous embodiment, the first suction port comprises an interface means, which is adapted for selectively coupling and decoupling the first suction port and the second suction port when the trolley engages the docking station. Resultantly, the interface means enables a precise engagement of the trolley and the docking station, such that the first and the second suction port align. The coupling of the suction ports is therefore independent from their alignment. By selectively coupling the suction ports, an operator is able to check whether a correct alignment has been conducted. With the interface means, also a locking function between the first and the second suction port may be accomplished, i.e. the rigid connection between the ports.

Preferably, the docking station is a receiving space having at least two delimiting walls, wherein one of the at least two delimiting walls carries the second suction port. Such a receiving space may be integrated into a galley, such that it hardly differs from any trolley storage space. Due to the lack of bulky components in the docking station, the docking station may recite next to other trolley spaces and provides for a smooth appearance and an extremely space-efficient way to handle waste in the vehicle.

At least one of the at least two delimiting walls may comprise at least one guide means for aligning the trolley in the receiving space. Virtually any guide means may be used for guiding the trolley, such that an improved alignment of the two suction ports may be reached. The guide means may thereby use recesses, protrusions, undercuts, dedicated guide rails, distancing elements, end stops, etc. The guide means may also provide for a fixation of the trolley in the inserted position. In this regard, the guide means may comprise a guide rail having an S-shaped profile, which is adapted for pulling and/or clamping the trolley into a tight position relative to the second suction port in a delimiting surface of the receiving space of the docking station. However, for this regard the guide means may also comprise magnetic elements, such as selectively activatable electromagnets.

Still further, the trolley may comprise a drainage means for disposing of liquids, which are contained in the waste and accumulate in a bottom region of the trolley due to compaction of waste, into the suction line. An excessive accumulation of liquids in a bottom region of the trolley may be prevented, which liquids may drip off the trolley when it is moved inside the cabin. By disposing the liquids off into the suction line, maintaining the trolley may be reduced to a minimum.

It is further noted that the trolley of the waste compaction system may comprise a separate compaction chamber, in which the compaction sleeve and the movable upper frame are integrated. Separate from this, a storage chamber may additionally be present, in which already compacted waste may be stored. This equally relates to half size and full size trolleys.

Further, independent from the chosen size of the trolley, an additional compaction chamber may be integrated into the trolley. The second or further additional compaction chamber may comprise a further movable upper frame, while the dimensioning of all upper frames are adjusted to reflect the available space and the desired dimensions of the associated compaction chamber. Hence, the trolley may provide two or more independent compaction chambers allowing to sort waste.

The invention further relates to a cabin monument, comprising a suction line and a waste compaction system according to the above description.

Preferably, the cabin monument comprises at least one lavatory unit coupled with the suction line. As in cabin monuments, where a lavatory unit is installed, a suction line is present, the integration of the waste compaction system is simple.

The invention still further relates to an aircraft, comprising a vacuum system having a suction line, the aircraft further comprising a waste compaction system according to the above description and a cabin monument into which the suction line extends.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
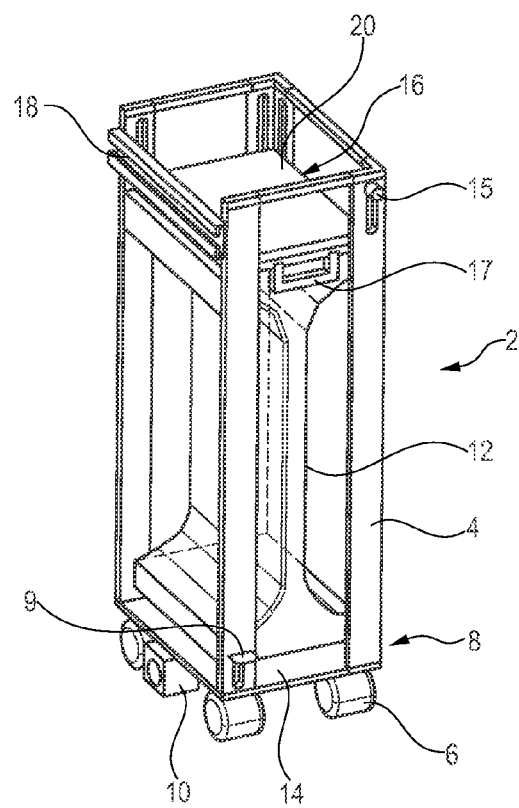
FIG. 1 shows a trolley in a three-dimensional view.

FIG. 1 shows a trolley 2 from a waste compaction system, the trolley comprising a housing 4, wheels 6 at a bottom region 8, a first suction port 10, a compaction sleeve 12 extending from a bottom plate 14 to an upper frame 16 and a guide rail 18 for aligning the trolley 2 in a predetermined spatial relationship to a counterpart of the rail 18. A locking lever 15 is located at a front side of the trolley 2 for locking or unlocking the upper frame 16. However, it may be worthwhile to consider a latching function when the upper frame 16 is pulled or moved into an uppermost position through handles 17 on opposite sides of the upper frame, such that the locking lever 15 is merely used for unlocking the upper frame 16. The trolley 2 is shown in a compaction position, which is explained in the following.

The compaction sleeve 12 is fixed to the bottom plate 14 in an airtight manner, e.g. through a tension belt surrounding the bottom plate 14 with a sealing material between the compaction sleeve 12 and the bottom plate, and, furthermore, is made from an airtight material. It extends to the upper frame 16 and is attached to the upper frame 16 in an airtight manner, too. For example, the fixation may be accomplished through gasket seals. The upper frame 16 comprises an opening, which is not visible in FIG. 1 as it is closed by means of a cover plate 20. The interior region of the compaction sleeve 12 is fluidly couplable with the first suction port 10 after connecting the first suction port 10 with a second suction port through pressing a connection pedal 9 located at a bottom of a front side of the trolley. Hence, by providing a suction force on the first suction port 10, air is sucked from the interior of the compaction sleeve. Consequently, the compaction sleeve 12 bulges inwardly and pulls down the upper frame 16 into the position shown in FIG. 1.

Through this method, a waste collection bag inserted into the compaction sleeve will be compacted, as well as all items inside the bag. Hence, through applying a vacuum to the first suction port 10, waste in the waste bag inserted into the compaction sleeve 12 is compacted.

Figure 2:
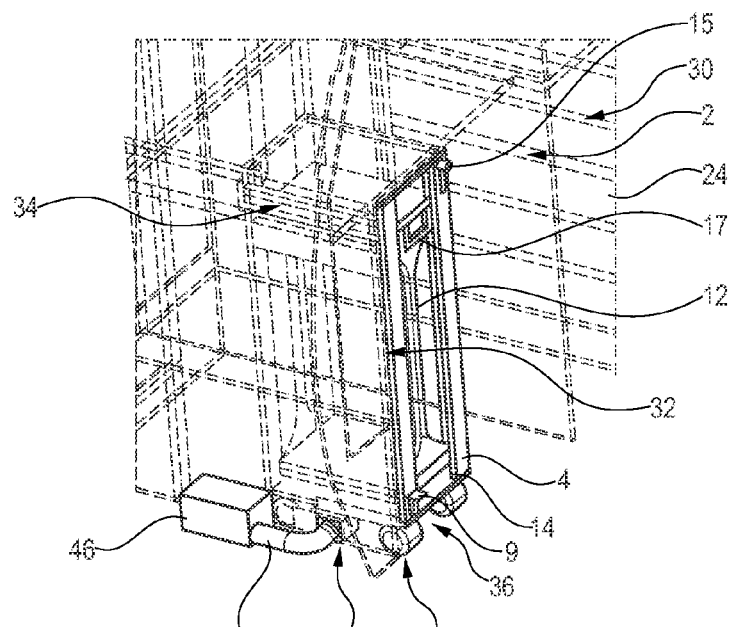
FIG. 2 shows a trolley inserted into a docking station.

In FIG. 2, the trolley 2 is inserted into a docking station 22, which is integrated into a galley section 24 and which comprises a second suction port 26 coupled with a suction line 28. Hence, this constitutes a waste compaction system 30.

The docking station 22 comprises a lateral wall 32, to which a guide rail 34 is attached. This guide rail 34 is adapted for engaging guide rail 18 of the trolley 2, such that it aligns in a predetermined spatial relationship to the lateral wall 32 and, especially, to the second suction port 26.

In a fully inserted position, the first suction port 10 and the second suction port 26 align. In this position, a user may actuate the connection pedal 9 at an edge 36 close to the second suction port 26, which pedal 9 is coupled with a connection means that connects the first suction port 10 and the second suction port 26 and at the same time holds the trolley 2 in place. The latter function may be accomplished separately through the locking means 15 or through the connection between the suction ports 10 and 26.

Figure 3:
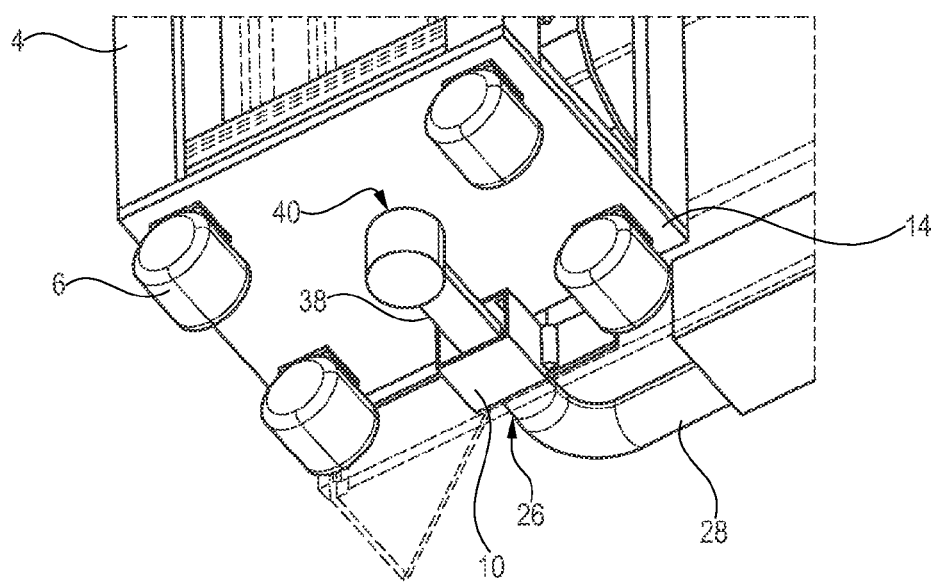
FIG. 3 shows a detailed view from underneath the bottom region of a trolley.
Figure 4:
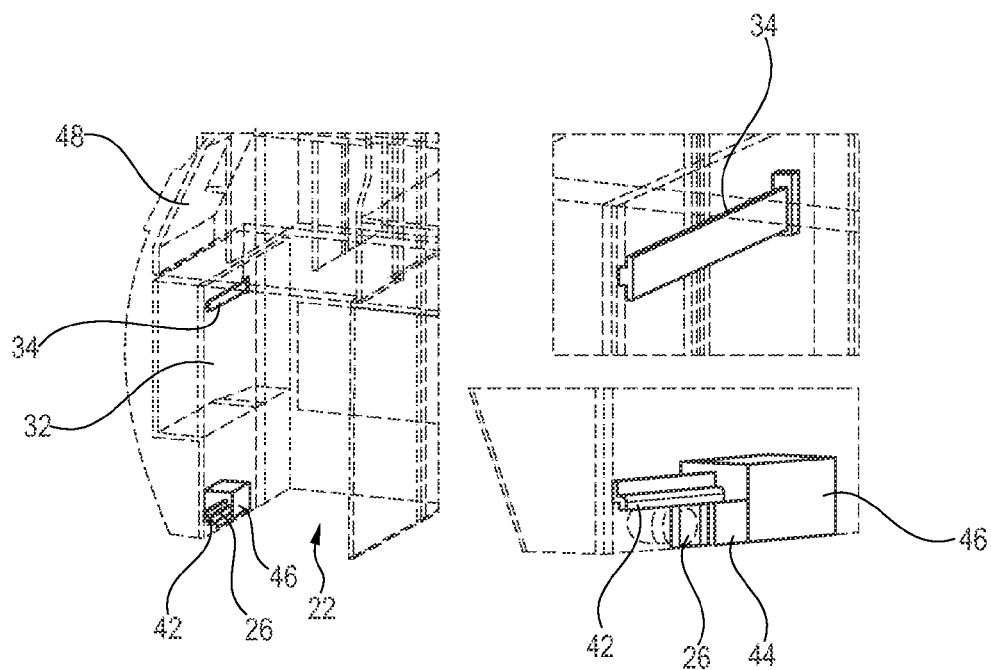
FIG. 4 shows a detail of the docking station.

In FIG. 3, a detailed view from underneath the bottom region 8 of trolley 2 is shown. Here, the first suction port 10 is coupled to a duct 38, which reaches through the bottom panel 14 in an opening 40 thereof. By applying a suction on the first suction port 10, air is drawn through opening 40 into the suction line 28. FIG. 4 shows the docking station 22 without inserted trolley 2 from another viewing angle. Here, the wall 32 is clearly visible, carrying the guide rail 34 at a top end and a further guide rail with a clearly smaller extension 42 at a bottom end in the region of the second suction port 26. Here, the guide rail 42 is located directly on top of the second suction port 26.

Above the bottom panel 14 a grid, sieve or another perforated component may be situated, which allows draining liquids from a waste bag onto the bottom panel 14. These liquids may accumulate on the bottom panel 14 and are drawn into the duct 38 by coupling with the suction line.

As visible in FIG. 4, the second suction port 26 may comprise a sliding flap 44, which is adapted for covering the second suction port 26 in case when it is not needed, i.e. when the trolley 2 is not inserted. The sliding flap 44 may be spring-loaded, such that it opens the second suction port 26 automatically, when the trolley 2 is inserted into the docking station 22 and closed, when trolley 2 is pulled out.

Next to the second suction port 26 and coupled with the duct 28, a flush valve 46 is arranged. This may be controlled through an operating panel 48 located above docking station 22. After trolley 2 is inserted into docking station 22, an operator may press a button on the operating panel 48, such that the flush valve 46 is opened to provide a suction on the second suction port 26.

Figure 5:
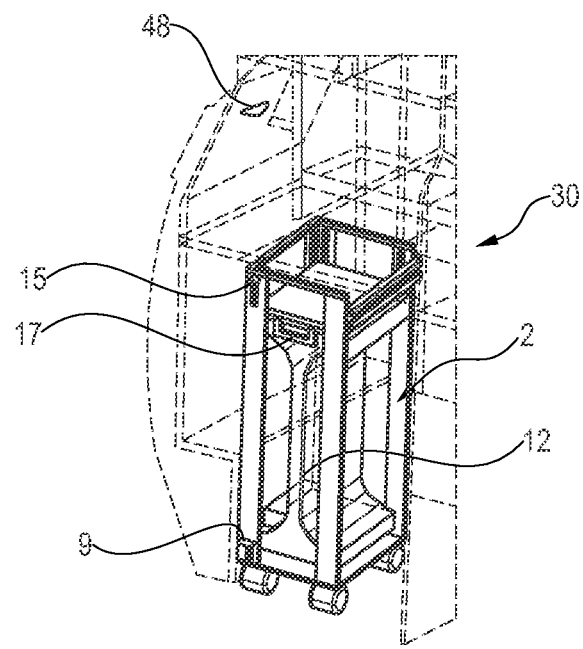
FIG. 5 shows the trolley from another viewing angle in a three-dimensional view.

In a still further view of the waste compaction system 30 from the same viewing angle as docking station 22 in FIG. 4, is shown in FIG. 5. Here, the trolley 2 is shown in a compaction position, in which a suction is applied to the compaction sleeve 12.

Figure 6A:
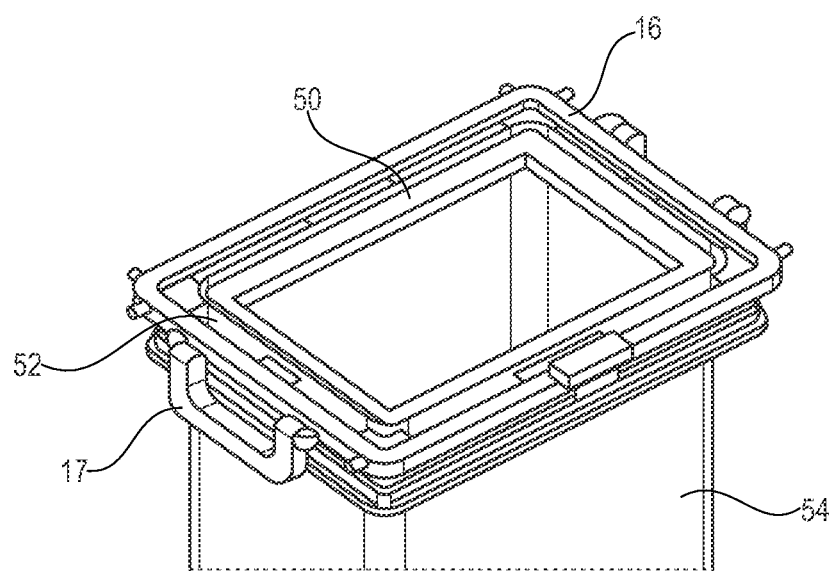
FIGS. 6a to 6c show the upper frame in detail views.
Figure 6B:
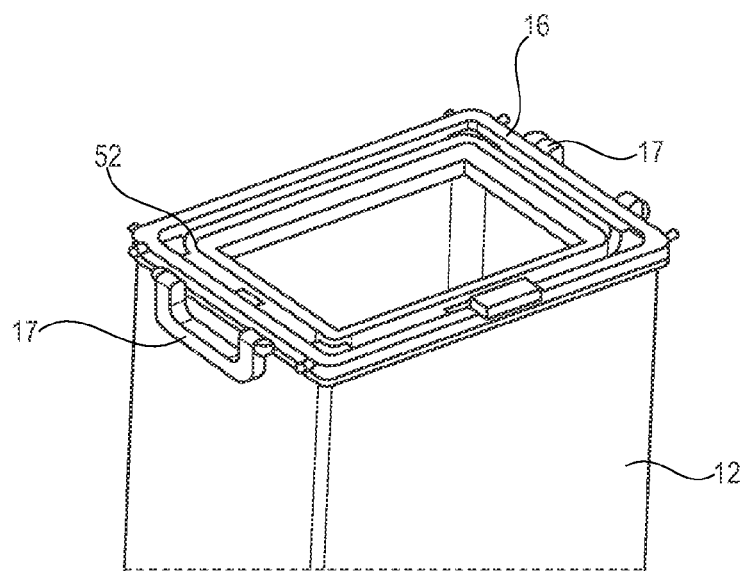

In FIG. 6a, a detailed view of an upper frame 16 is shown. In the upper frame 16, a ventilation frame 50 is integrated, which comprises ventilation openings 52 that provide the ability for air to flow through the openings 52 into the compaction sleeve 12. The ventilation frame 50 allows to clamp a waste bag 54 to the upper frame 16, which is then enclosed by the compaction sleeve 12, as visible in FIG. 6b.

When the upper frame 16 is closed by the cover panel 20, it is close to the surrounding in an airtight manner. However, when the compaction process starts, air from the waste bag 54 may flow into the compaction sleeve 12 through the openings 52.

The ventilation frame 50 may be installed in a recess 56 of the upper frame 16. For allowing air to flow from the waste bag 54 to the compaction sleeve 12 it is desired that an upper delimiting edge 58 of the upper frame 16 protrudes over an upper delimiting surface 60 of the ventilation frame 50. Air from the waste bag may then flow around the ventilation frame 50 into the respective openings 52, as indicated by arrows 62.

Figure 6C:
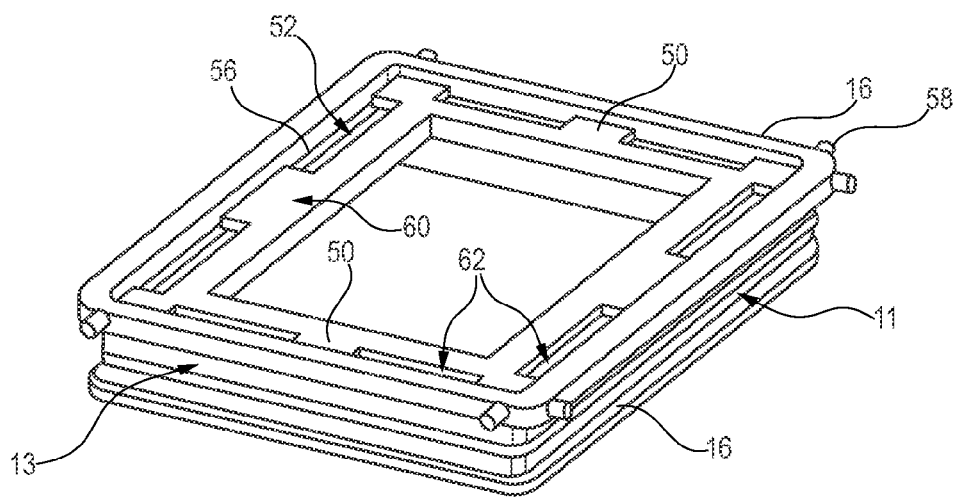

In FIG. 6c the upper frame 16 is shown having a tension belt 13 wrapped around a recess for fastening the compaction sleeve 12.

Figure 7A:
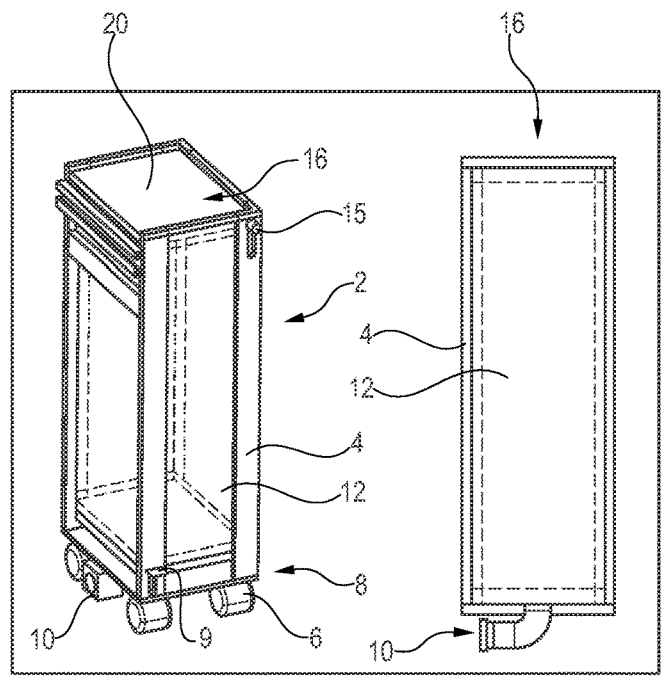
FIGS. 7a and 7b show the trolley in a waste collection and in a compaction position.
Figure 7B:
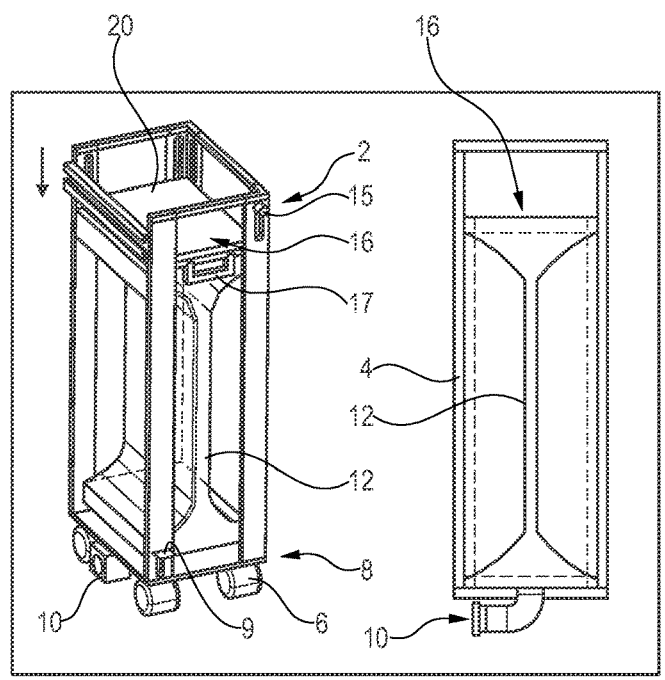

FIGS. 7a and 7b show the trolley 2 in two different positions. FIG. 7a shows trolley 2 in an uncompacted position, where the upper frame 16 is at an uppermost position in the trolley housing 4. The compaction sleeve 12 fills the housing 4 completely and it is possible to collect as much waste as possible.

In FIG. 7b, trolley 2 is shown in a compaction position, in which a vacuum is applied to the first suction port 10, such that air is drawn from compaction sleeve 12, leading to the upper frame 16 to move downward into the compacted position as shown. For reverting to the upper position of FIG. 7a, the upper frame 16 comprises preferably two handles 17 at opposite ends of the upper frame 16, allowing a user to pull the upper frame 16 upwardly.

Figure 8:
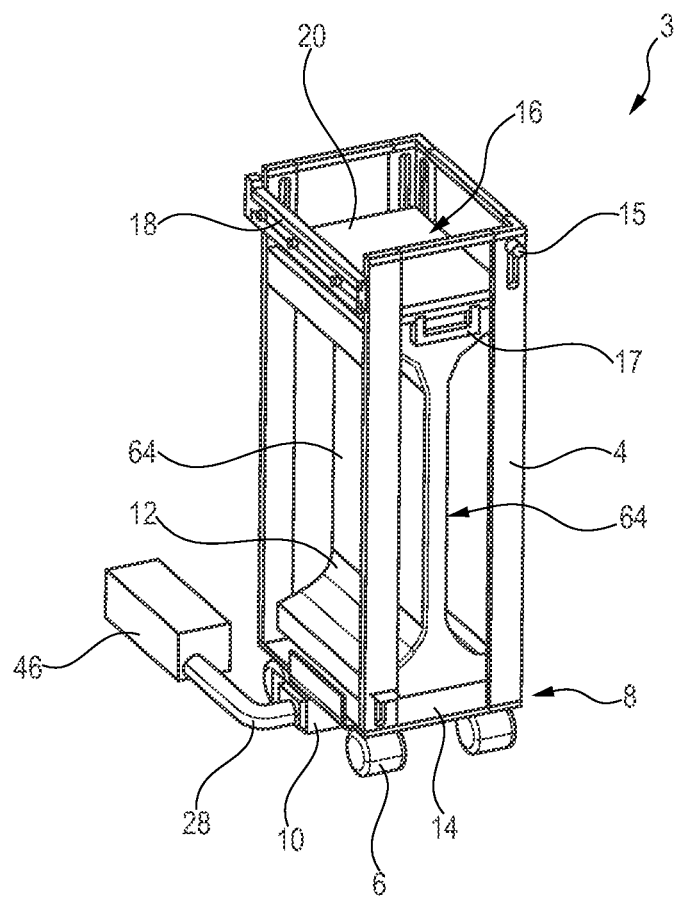
FIG. 8 shows a trolley with a compaction sleeve having rigid plates.

In FIG. 8, a still further trolley 3 is shown, which comprises rigid plates 64 on lateral delimiting surfaces of the compaction sleeve 12. The plates 64 may preferably be placed on interior surfaces of the compaction sleeve 12. Hence, through evacuating the compaction sleeve 12, the rigid plates prevent the presence of local bulges formed in the compaction sleeve 12 due to waste objects and exert a much more even and harmonic pressing force on the waste objects in the compaction sleeve. The plates 64 may consist of any material, which is commonly used for lightweight applications and may include fiber-reinforced materials, in particular fibers embedded in phenolic resins, such as CFRP and GFRP, and may also comprise honeycomb cores covered with cover layers. Resultantly, the waste compaction is extremely efficient and at the same time comprises a distinctly low weight.

Figure 9:
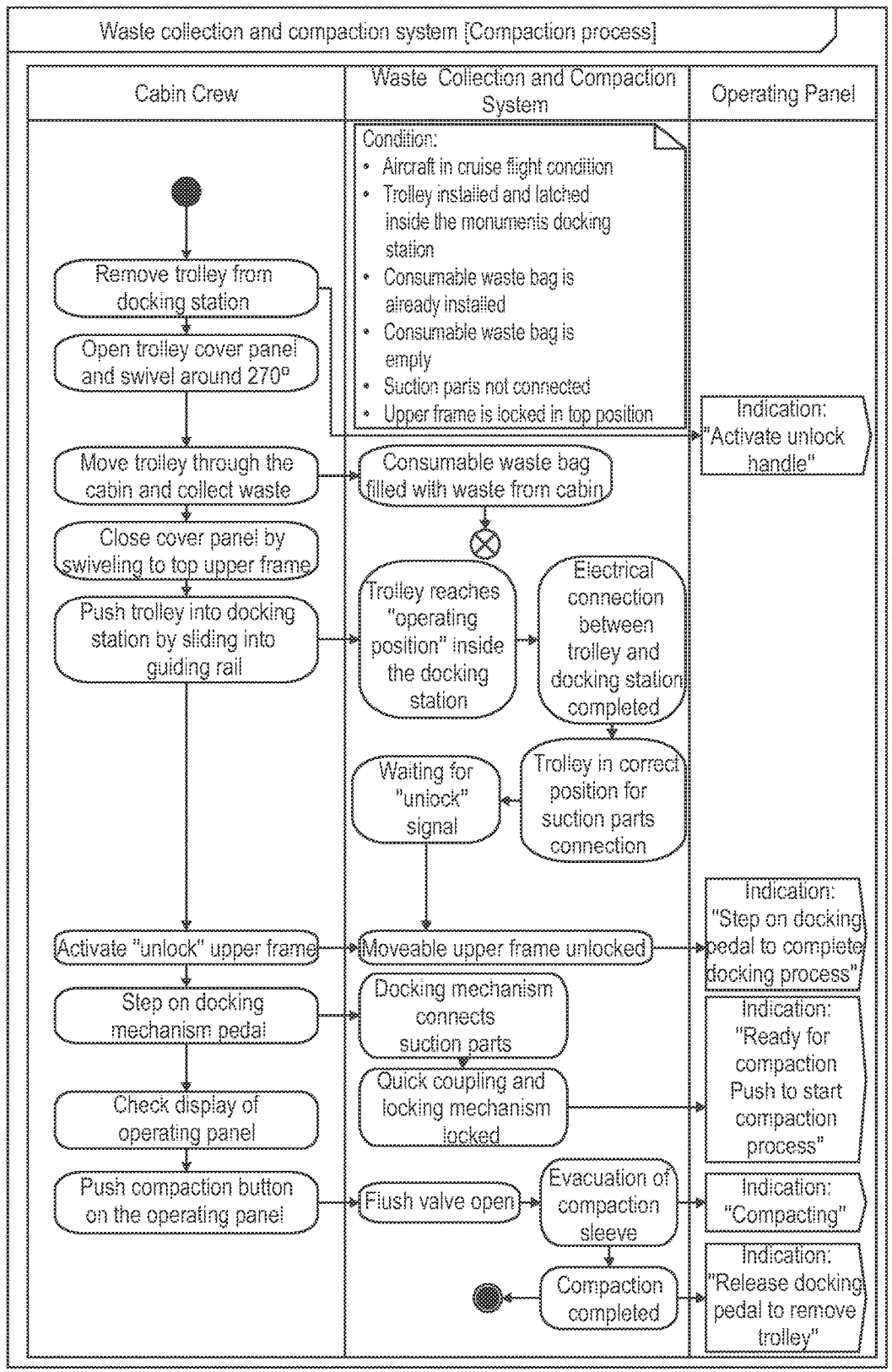
FIGS. 9 and 10 show the compaction and the waste bag replacement in flow charts.

FIG. 9 shows a flow chart for the steps conducted during a waste compaction process. First of all, the trolley 2 is removed from the docking station 22 and the cover panel 20 is opened, for example through swiveling it around 270°. The trolley may then be moved through the cabin to collect waste. Afterwards the cover panel 20 is closed by swiveling it back to the top of the upper frame 16. The trolley 2 is pushed back into the docking station 22 b sliding into guide rails 34 and 42. The trolley 2 reaches an operating position and the upper frame 16 may be unlocked through the locking lever 15. Directly thereafter the pedal 9 for activating the docking mechanism may be pressed and a display or another indicator of the operating panel 48 may be checked, afterwards the compaction process initiated through pressing a compaction button.

On the system side, the removal of the trolley and the compaction process is shown based on several conditions, such as aircraft in cruise flight condition, trolley 2 installed and latched inside the monuments docking station 22, consumable waste bag is already installed and empty, suction ports are not connected and upper frame 16 in top position. The compaction system may check whether the trolley 2 reaches an operating position inside the docking station 22, in which an electrical connection between trolley 2 and the docking station, e.g. for receiving sensor signals representing the position of the upper frame 16, the position of the locking lever 15 or the pedal 9. If the trolley 2 is detected to be in a correct position for the connection of the suction ports 10, 26, the system may wait for an "unlock" signal for unlocking the upper frame 16. This may be indicated in the operating panel 48. Afterwards, the operating panel may indicated to step on the pedal 9 to complete the docking process, after which the suction ports 10 and 26 are coupled. After indicating that the system is ready for compaction, the compaction process may be initiated through pressing a button. Consequently, the flush valve 46 is opened and air is sucked of from the compaction sleeve 12. Finally, after the compaction process, which is indicated on the operating panel 48, the user is made aware that the trolley 2 may be released by releasing the pedal 9 again.

Figure 10:
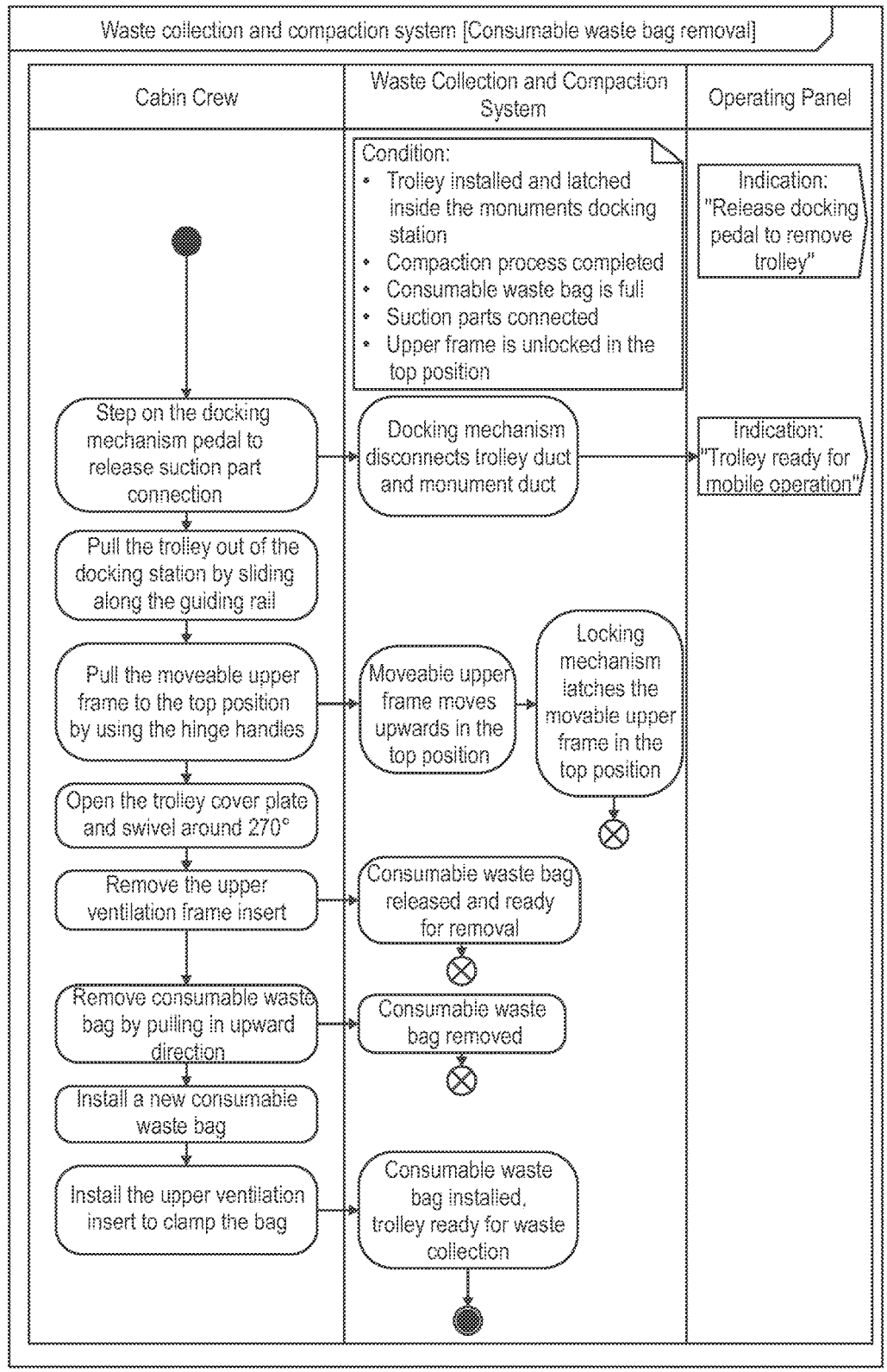

FIG. 10 finally shows the process of removing the waste bag from the trolley. The suction port connection has to be released by releasing the pedal 9. The trolley 2 is pulled out of the docking station 22 by sliding along the guide rails 34, 42 and the upper frame 16 is pulled into an upmost position by using the handles 17. The trolley cover panel 20 is opened and e.g. swiveled back around 270°. After removing the ventilation frame 50, the waste bag can be removed by pulling in an upward direction. After installing a new waste bag the upper ventilation frame 50 may be installed again and the trolley 2 is ready for waste collection.

On the system side the suction ports 10 and 26 are disconnected when the pedal 9 is released. The upper frame 16 may further be automatically or manually locked or latched in a top position after it has been pulled upwards. The operating panel may indicate that trolley 2 is ready for mobile operation, i.e. waste collection, after the pedal 9 has been released.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A waste compaction system for a vehicle, the system comprising:
    a moveable trolley for storing waste; and
    a docking station integratable into a cabin monument for inserting the trolley;
    wherein the trolley comprises a housing having an opening for inserting waste, at least one vacuum waste compacting mechanism inside the housing and a first suction port accessible from outside the housing, the first suction port being coublable with the at least one vacuum waste compacting mechanism,
    wherein the docking station and the trolley are adapted to each other such that the trolley is engageable with the docking station,
    wherein the docking station comprises a second suction port couplable with a suction line in the vehicle and the first suction port,
    wherein the at least one vacuum waste compacting mechanism comprises a compaction sleeve extending from a bottom of the trolley housing to a movable upper frame facing to the opening of the trolley,
    wherein the trolley further comprises a ventilation frame which is insertable into an interior area section of the movable upper frame, and
    wherein the ventilation frame comprises ventilation openings and is adapted for holding a waste bag such that the waste bag is enclosed by the compaction sleeve, and for providing air exchange between the waste bag and a volume enclosed by the compaction sleeve.

2. The waste compaction system of claim 1, wherein the first suction port is coupled with the interior of the compaction sleeve through an opening in at least one of the compaction sleeve and a bottom of the trolley.

3. The waste compaction system of claim 1,
    wherein the compaction sleeve comprises first and second flat, rigid plates integrated into first and second lateral surfaces of the compaction sleeve, and
    wherein the first and second plates are dimensioned such that by evacuating the compaction sleeve the first and second plates approach each other substantially parallelly.

4. The waste compaction system of claim 1, wherein the opening of the trolley housing is positioned in the movable upper frame.

5. The waste compaction system of claim 1, wherein the upper frame is lockable in at least one position.

6. The waste compaction system of claim 1, wherein a cover plate is placeable on the opening in a sealing manner.

7. The waste compaction system of claim 1, wherein the first suction port comprises an interface means adapted for selectively coupling and decoupling the first suction port and the second suction port, when the trolley engages the docking station.

8. The waste compaction system of claim 1, wherein the docking station is a receiving space having at least first and second delimiting walls, wherein one of the at least first and second delimiting walls carries the second suction port.

9. The waste compaction system of claim 8, wherein at least one of the at least first and second delimiting walls comprises at least one guide means for aligning the trolley in the receiving space.

10. The waste compaction system of claim 1, wherein the trolley comprises a drainage means for disposing of liquids, which are contained in the waste and accumulate in a bottom region of the trolley due to compaction of waste, into the suction line.

11. A cabin monument comprising a suction line and a waste compaction system comprising:
    a moveable trolley for storing waste; and
    a docking station integratable into a cabin monument for inserting the trolley;
    wherein the trolley comprises a housing having an opening for inserting waste, at least one vacuum waste compacting mechanism inside the housing and a first suction port accessible from outside the housing, the first suction port being coublable with the at least one vacuum waste compacting mechanism,
    wherein the docking station and the trolley are adapted to each other such that the trolley is engageable with the docking station,
    wherein the docking station comprises a second suction port couplable with a suction line in the vehicle and the first suction port,
    wherein the at least one vacuum waste compacting mechanism comprises a compaction sleeve extending from a bottom of the trolley housing to a movable upper frame facing to the opening of the trolley,
    wherein the trolley further comprises a ventilation frame which is insertable into an interior area section of the movable upper frame, and
    wherein the ventilation frame comprises ventilation openings and is adapted for holding a waste bag such that the waste bag is enclosed by the compaction sleeve, and for providing air exchange between the waste bag and a volume enclosed by the compaction sleeve.

12. The cabin monument of claim 11, wherein the cabin monument comprises at least one lavatory unit coupled with the suction line.

13. An aircraft, comprising a vacuum system having a suction line, the aircraft further comprising a waste compaction system and a cabin monument into which the suction line extends, the waste compaction system comprising:
- a moveable trolley for storing waste; and
- a docking station integratable into a cabin monument for inserting the trolley;
- wherein the trolley comprises a housing having an opening for inserting waste, at least one vacuum waste compacting mechanism inside the housing and a first suction port accessible from outside the housing, the first suction port being coublable with the at least one vacuum waste compacting mechanism,
- wherein the docking station and the trolley are adapted to each other such that the trolley is engageable with the docking station,
- wherein the docking station comprises a second suction port couplable with a suction line in the vehicle and the first suction port,
- wherein the at least one vacuum waste compacting mechanism comprises a compaction sleeve extending from a bottom of the trolley housing to a movable upper frame facing to the opening of the trolley,
- wherein the trolley further comprises a ventilation frame which is insertable into an interior area section of the movable upper frame, and
- wherein the ventilation frame comprises ventilation openings and is adapted for holding a waste bag such that the waste bag is enclosed by the compaction sleeve, and for providing air exchange between the waste bag and a volume enclosed by the compaction sleeve.

* * * * *